United States Patent [19]

Caskey

[11] Patent Number: 4,842,910

[45] Date of Patent: Jun. 27, 1989

[54] ASSEMBLY OF WATER WET HOLLOW FIBERS AND A TUBESHEET DERIVED FROM A DIGLYCIDYL ETHER OF A DIHYDROXY BENZENE

[75] Inventor: Terrence L. Caskey, Concord, Calif.

[73] Assignee: The Dow Chemical Company, Midland, Mich.

[21] Appl. No.: 185,172

[22] Filed: Apr. 22, 1988

Related U.S. Application Data

[63] Continuation of Ser. No. 894,221, Aug. 7, 1986, abandoned.

[51] Int. Cl.$^4$ .................... B29C 6/00; B29C 27/30
[52] U.S. Cl. .................... 428/36.3; 156/330; 210/500.3; 264/258; 428/378; 428/398; 528/103
[58] Field of Search ............ 428/36.3, 398, 378; 528/103; 210/500.3, 500.31, 500.32; 264/258; 156/330

[56] References Cited

U.S. PATENT DOCUMENTS

| | | | |
|---|---|---|---|
| 2,935,488 | 5/1960 | Phillips et al. | 260/45 |
| 3,422,008 | 1/1969 | McLain | 210/22 |
| 3,494,780 | 2/1970 | Skiens | 210/321 |
| 3,619,459 | 11/1971 | Schrader | 264/262 |
| 3,703,962 | 11/1972 | Schrader | 210/321 |
| 3,728,425 | 4/1978 | Schrader | 264/49 |
| 3,755,034 | 8/1973 | Mahon et al. | 156/169 |
| 4,183,890 | 1/1980 | Bollinger | 264/139 |
| 4,369,605 | 1/1983 | Opersteny et al. | 51/319 |
| 4,430,807 | 2/1984 | Davis et al. | 34/9 |

FOREIGN PATENT DOCUMENTS 0044075 1/1982 European Pat. Off. .
50-91577 7/1975 Japan .

OTHER PUBLICATIONS

T. A. Orafino, "Chapter 15, Technology of Hollow Fiber Reverse Osmosis Systems", Sourirajan editor *Reverse Osmosis Synthetic Membranes*, in particular, p. 330, column 2, (part d).

Primary Examiner—Ellis P. Robinson
Assistant Examiner—James J. Seidleck

[57] ABSTRACT

The invention is a hollow fiber and tubesheet assembly which comprises (A) a non-random fiber bundle comprising water wet cellulose ester hollow fibers wherein the fiber is water wet when the assembly is fabricated, wherein any of said fibers processed using plasticizers have been leached to remove the plasticizer; and (B) a tubesheet which comprises the reaction product of:
  (i) an epoxy resin comprising about
    (a) between about 10 and 100 percent by weight of a diglycidyl ether of a dihydroxy benzene;
    (b) between about 0 and about 90 percent by weight of a polyglycidyl ether of a polyhydric phenol which is not a diglycidyl ether of dihydroxy benzene;
  (ii) a curing agent in sufficient amount to cure the epoxy resin composition;
wherein a portion of the hollow fibers are embedded in the tubesheet.

24 Claims, No Drawings

ASSEMBLY OF WATER WET HOLLOW FIBERS AND A TUBESHEET DERIVED FROM A DIGLYCIDYL ETHER OF A DIHYDROXY BENZENE

CROSS-REFERENCE TO RELATED APPLICATION

This application is a continuation of applicant's copending U.S. application, Ser. No. 894,221, filed Aug. 7, 1986 now abandoned.

BACKGROUND OF INVENTION

This invention relates to a hollow fiber and tubesheet assembly wherein the hollow fiber is a water wet fiber and a novel tubesheet material. In another aspect, this invention relates to a method for preparing such a tubesheet assembly.

The hollow fiber tubesheet assemblies of this invention are major components of hollow fiber membrane devices. Many types of hollow fibers are prepared by a wet spinning process, one such class of fibers are the cellulose ester fibers. Hollow fiber membrane devices of cellulose ester hollow fibers are useful in the purification of water and in the separation of gases. An example of cellulose ester hollow fibers by a wet spinning process is described U.S. Pat. No. 3,532,527 (incorporated herein by reference), in which a mixture of a cellulose ester, a plasticizer for the cellulose ester, and a polyol is melt extruded using a suitable extruder to prepare a hollow fiber. The fiber is passed through an air zone wherein the fiber is quenched to freeze the molten mixture, thereafter the fiber is passed through a water bath wherein the plasticizer and polyol are leached out and replaced by water. As the fiber exits the water bath, the fiber is covered with droplets of water and the surface is water saturated. To make hollow fiber devices from such fibers, it is necessary to form tubesheets of a thermoset or thermoplastic material about a portion of the hollow fibers. Similar processes are used for other classes of hollow fibers.

One significant problem in forming tubesheets about a water wet hollow fiber is that most thermoset and thermoplastic materials do not adhere to wet fibers. Therefore, in order to form tubesheets about the water wet hollow fibers, it is highly desirable to dry a portion of the hollow fibers so that the tubesheets may be formed about them. Failure to dry the fibers results in a tubesheet which will not adhere or will adhere poorly to the fibers. One problem with drying the fibers is that if the fibers are dried too much the efficacy of such fibers for certain operations will be significantly diminished. What is needed is a tubesheet assembly and method for formation of a tubesheet assembly, which can be formed from water wet hollow fibers.

SUMMARY OF INVENTION

The invention is a hollow fiber and tubesheet assembly which comprises
(A) a non-random fiber bundle comprising water wet hollow fibers; and
(B) a tubesheet which comprises the reaction product of:
(i) a resin comprising about
 (a) between about 10 and about 100 percent by weight of a diglycidyl ether of a dihydroxy benzene;
 (b) between about 0 and about 90 percent by weight of a polyglycidyl ether of a polyhydric phenol
(ii) an epoxy resin curing agent in sufficient amount to cure the resin composition In another aspect, this invention is a method of forming such a tubesheet assembly. More particularly, a non-random bundle of the water wet hollow fibers are contacted with the tubesheet composition described hereinbefore and exposed to conditions such that the tubesheet composition undergoes curing wherein a portion of the non-random bundle of hollow fibers is embedded in such tubesheet.

The hollow fiber tubesheet assemblies of this invention are useful in hollow fiber separation devices, wherein said separation devices can be used to purify water, and to separate certain gases, for example, $CO_2$ oxygen and nitrogen, and the like. These tubesheet assemblies demonstrate significantly improved adhesion between the tubesheet material and the hollow fibers when the hollow fibers are water wet when contacted with the tubesheet material. This invention provides a significant advantage in that no drying is necessary before forming the tubesheet about the hollow fiber bundle, and therefore any risk of damage to the fibers due to drying is eliminated or minimized.

DETAILED DESCRIPTION OF THE INVENTION

It is believed that the improved adherence between the tubesheet material and the water wet hollow fibers is a result of the presence of diglycidyl ethers of dihydroxy benzenes in the tubesheet composition. The diglycidyl ethers of dihydroxy benzenes should be present in an amount sufficient to significantly enhance the adherence of the tubesheet material to water wet hollow fibers.

Any diglycidyl ether of a dihydroxy benzene may be used to enhance the adherence of the tubesheet to the water wet hollow fibers. The benzene rings of such diglycidyl ethers can be further substituted with one or more substituents which are inert to the hollow fibers and to the reactants used to prepare the epoxy resin tubesheets. Preferred inert substituents include alkyl, cycloalkyl and halo moieties. Preferred diglycidyl ethers of dihydroxy benzenes correspond to the formula

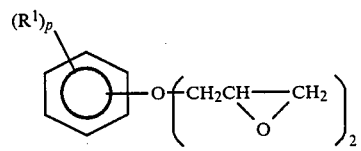

wherein
$R^1$ is separately in each occurrence alkyl, cycloalkyl, halo; and
p is separately in each occurrence an integer of from about 0 to about 4.

Examples of more preferred diglycidyl ethers of dihydroxy benzene include diglycidyl ether of orthodihydroxy benzene (diglycidyl ether of catechol), diglycidyl ether of meta-dihydroxy benzene (diglycidyl ether of resorcinol) and diglycidyl ether of paradihydroxy benzene (diglycidyl ether of hydroquinone). The most preferred diglycidyl ether of dihydroxy benzene is the diglycidyl ether of metadihydroxy benzene (diglycidyl ether of resorcinol).

The tubesheets of this invention comprise epoxy resins in which at least 10% by weight of the epoxy resins are diglycidyl ethers of a dihydroxy benzene. The remainder of the epoxy resins are prepared from any epoxy resin which adheres to water wet fibers, when in admixture with diglycidyl ethers of dihydroxy benzene and provides stability to hollow fiber membrane devices once cured in the manner described hereinafter.

Polyepoxide resins which are desirable for the resin formulations of this invention include glycidyl polyethers of polyhydric phenols. Illustrative of the polyhydric phenols are mononuclear phenols, polynuclear phenols and included within the latter are the phenolaldehyde condensation resins commonly known as novolac resins. Typical mononuclear phenols include phloroglucinol and the like. Examples of polynuclear phenols include 2,2-bis(4-hydroxyphenyl)-propane(bisphenol A), 4,4'-dihydroxy-benzophenone, 1,1-bis(4-hydroxyphenyl)-ethane, bis(2-hydroxynaphthyl)-methane, 2,2-bis(4-hydroxyphenyl)butane, 4,4'-dihydroxyphenyl phenyl sulfone and the like. Novolac resins include the condensation products of phenol-formaldehyde and the like.

The preparation of such resins is well known and is described in a number of patents such as U.S. Pat. No. 2,935,488 and others and in textbooks such as Lee and Neville, *Handbook of Epoxy Resins*, McGraw-Hill Book Co., 1967 (both incorporated herein by reference).

Preferred epoxy resins include those corresponding to the formula

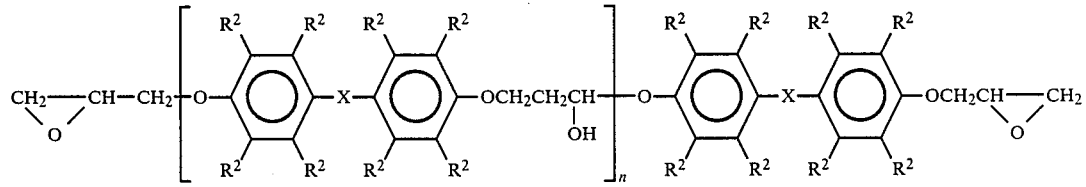

wherein
$R^2$ is separately in each occurrence hydrogen, methyl, fluorine, chlorine or bromine;
X is

S, $-SO_2-$, $-O-$, a $C_{1-6}$ divalent hydrocarbon, a $C_{1-6}$ divalent halohydrocarbon, or a divalent $C_{1-6}$ perhalocarbon;
n is 0 to 6.

More preferred epoxy resins are those resins derived from bisphenol A, e.g., diglycidyl ethers of bisphenol A. Such preferred resins generally correspond to the formula

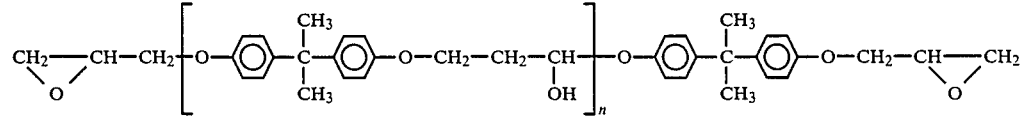

wherein n is as described hereinbefore. In the discussion hereinafter, all parts with respect to the resin formulation will be based on 100 parts by weight of the epoxy resin (parts per hundred parts of resin, phr).

In the hereinbefore presented formulas, $R^1$ is preferably methyl or halo, and more preferably chlorine or bromine. $R^2$ is preferably hydrogen, methyl, fluorine, chlorine, or bromine. $R^2$ is more preferably hydrogen or bromine, and most preferably hydrogen. X is preferably $C_{1-6}$ alkyl, $C_{1-6}$ halo substituted alkyl, and $C_{1-6}$ perhalo alkyl. X is more preferably $C_{1-6}$ alkyl, and most preferably

Preferably, p is 0 or 1, and most preferably 0. Preferably n is between about 0 and about 4, and most preferably between about 0 and about 1.5. Halo-substituted alkyl refers herein to an alkyl group substituted with one or more halo groups wherein the alkyl group has one or more hydrogen atoms bound to at least one carbon atom. Perhalo alkyl refers herein to an alkyl group which is completely substituted with halogen atoms in place of all of the hydrogen atoms.

The term "glycidyl ethers" as used herein refers collectively to all of the glycidyl ethers in a resin formulation, including the diglycidyl ethers of a dihydroxy benzene, and the polyglycidyl ethers of a polyhydric phenol. The tubesheet compositions of this invention generally comprise glycidyl ethers wherein at least 10% by weight of the glycidyl ethers of this invention are diglycidyl ethers of dihydroxy benzene. More preferably, at least 20 percent by weight of the glycidyl ethers are diglycidyl ethers of a dihydroxy benzene. Most preferably, the glycidyl ethers comprise between about 40 and about 70 percent by weight of a diglycidyl ether of a dihydroxy benzene and about 30 and about 70 percent by weight of a polyglycidyl ether of a polyhydric phenol, wherein such polyglycidyl ether of a polyhydric phenol is not a diglycidyl ether of a dihydroxy benzene.

The tubesheet compositions of this invention further comprise curing agents which are organic compounds having two or more groups which are reactive with epoxy groups and which are reactive with epoxy groups in the presence of water. Typical groups which are reactive with epoxy groups are active hydrogen groups, such as hydroxyl groups, carboxy groups, amino groups, thio groups and the like. Examples of such curing agents can be found in U.S. Pat. No. 2,935,488, incorporated herein by reference. Preferred curing agents are polyfunctional amines. Preferred polyfunctional amines are the diamines.

Cyanoethylated polyamines, e.g., ethylene diamine or other aliphatic polyamines modified with acrylonitrile, is one class of curing agents useful. Lee and Neville, *Handbook of Epoxy Resins*, pp. 7–22 to 7–24 (1967), describes such curing agents. Particularly preferred are the modified polyamines sold by Pacific Anchor Chemical Corporation under the designation ANCAMINE® 1365 (a modified cycloaliphatic amine), ANCAMINE® 1636 (a cyanoethylated aliphatic amine) and ANCAMINE® 1942 (a cyanoethylated aliphatic amine). The amount of curing agent required depends on its equivalent weight and other factors and can readily be determined empirically. The curing agent ANCAMINE® 1942, for example, is advantageously present in from about 15 to about 50, preferably about 30 to 45, parts per hundred resin by weight. Additives, fillers and modifiers may be advantageous in some embodiments. See for example U.S. Pat. No. 3,728,425 (incorporated herein by reference).

An optional third component of the tubesheet resin composition is an epoxy curing catalyst. An epoxy curing catalyst is not necessary in most embodiments. The use of such a catalyst is advantageous where the cure rate of the resin composition is slow. Any known epoxy curing catalyst which enhances the curing of a glycidyl ether with the curing agent may be used. Such catalysts are generally used in catalytic amounts, that is amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin, and most preferably between about 1 and 2 parts per hundred parts of resin. Preferred catalysts are tertiary amines, for example, benzyldimethylamine, N,N,N',N'-tetramethylbutanediamine, dimethylaminopropylamine, N-methylmorpholine, N-triethylenediamine, and the like and imidazoles, for example 2 ethyl-4-methylimidazole.

An optional component of the tubesheet composition is a flexibilizing agent which comprises a glycol of a polyalkylene oxide, or an ether thereof or a urea-capped polypropylene glycol. Preferred flexibility agents are poly-ethylene glycols, polypropylene glycols, and glycols containing both ethylene oxide and propylene oxide units. More preferred flexibilizing agents are the polyethylene glycols. One preferred urea-capped polypropylene glycol corresponds to the following formula

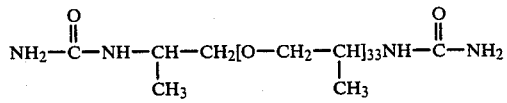

available under the trade name of JEFFAMINE® BuD-2000 from Texaco Chemical Company.

The water wet hollow fibers of this invention are hollow fibers which are prepared in a process which requires passing the fiber through water, wherein the fiber is not substantially dried before fabrication of the hollow fiber and tubesheet assembly. In one embodiment the hollow fibers are formed in a wet spinning process wherein the hollow fibers are formed from a molten polymer in a solvent/non-solvent pair in a melt extrusion process and the hollow fibers are passed through a water bath to remove the solvent and nonsolvent and replace them with water. Polymers which are formed from wet spinning processes are well known in the art and include polycarbonates derived from diphenolic compounds, for example, bisphenol A and substituted bisphenol A's, and polymers formed from film forming cellulose esters.

The preferred hollow fibers used in this invention are derived from cellulose esters. Cellulose ester hollow fiber membranes are well known in the prior art. The cellulose esters that are employed are of the film-forming variety and include such materials as cellulose mono-, di-, and tri-acetates, cellulose propionate, cellulose butyrate, cellulose acetate propionate, cellulose acetate butyrate, etc. and mixtures thereof. Preferred cellulose ester hollow fiber membranes are prepared from cellulose acetates, more preferably cellulose diacetates and cellulose triacetates, with cellulose triacetate hollow fiber membranes being most preferred. As manufactured, these membranes contain up to 70 weight percent water. While these hollow fibers can be homogeneous or asymmetric, asymmetric cellulose triacetate containing from about 40 to about 44 weight percent acetate is preferred. The hollow fibers of cellulose esters may be prepared by methods known to those skilled in the art. See for example U.S. Pat. No. 3,532,527, incorporated herein by reference.

Non-random hollow fiber bundle refers herein to a bundle of hollow fibers wherein the fibers are arranged in some pattern. Preferably, the hollow fibers are arranged about a core. In some instances, the core may be hollow. In other embodiments, the core may be perforated and hollow so as to allow introduction of a feed or removal of a product through such core. In one preferred embodiment, the hollow fibers are arranged in a parallel fashion, that is parallel to one another and parallel to any core which may be present. In another embodiment, the fibers may be arranged in a helix or bias-wrap fashion about a core or axis.

In another embodiment, this invention relates to a method of preparing a hollow fiber and tubesheet assembly which comprises (1) contacting
   (A) a non-random bundle of hollow fibers, wherein the fibers are water wet; with
   (B) a tubesheet composition which comprises
     (i) a resin comprising between about 10 and about 100 percent by weight of
       (a) a diglycidal ether of a dihydroxy benzene; and
       (b) between about 0 and about 90 percent by weight of a polyglycidyl ether of a polyhydric phenol;
     (ii) an epoxy resin curing agent in sufficient amounts to cure the resin composition
wherein a portion of the hollow fibers are embedded in the tubesheet; and (2) exposing the hollow fibers and tubesheet composition to conditions such that the tubesheet composition cures with a portion of the hollow fibers embedded therein.

The tubesheet can be formed and cured and a portion of the hollow fiber embedded therein by any one of a number of techniques known in the art. The tubesheet can be formed concurrent with the assembly of the fiber bundle by the application of the tubesheet forming material to the desired area of the fiber. Alternatively, the tubesheet can be cast or molded in the desired region after the fiber bundle is assembled. Centrifugal casting, as described in U.S. Pat. No. 3,339,341 (incorporated herein by reference), is also operable.

In forming the tubesheet, it is desirable that the viscosity of the material forming the tubesheet be low enough that good penetration between the fibers is attained, but not so low that excessive "wicking" into other regions of the fiber bundle occurs. The preferred viscosity will depend on the size of the hollow fibers, the packing factor for the bundle, the method used to form the tubesheet, and other factors. The best viscosity for the tubesheet resin can readily be determined empirically for a given set of conditions. The tubesheet resin advantageously does not exotherm excessively upon curing. Localized regions of high temperature during curing can deleteriously affect tubesheet strength and/or fiber properties. Further techniques for the formation of tubesheets on hollow fiber membrane devices are also disclosed in U.S. Pat. Nos. 3,339,341, 3,343,491, 3,619,459, 3,722,695, 3,728,425 and 4,138,460 (all incorporated herein by reference).

The tubesheet resin can be cured by exposing the resin to temperatures at which curing takes place. In some embodiments it may be necessary to heat the resin mixture to curing temperatures. Preferred curing temperatures are between about 0° and 100° C. It is preferable to cure the resin in a staged manner. In the first stage, the resin is cured at a relatively low temperature until the resin reaches the gel stage. Preferably the temperature for this stage should be low enough to avoid a large exotherms, as a large exotherms at an early stage of the cure may result in defects in the tubesheet hollow fiber assembly. Preferred temperatures for this early stage are between about 10° and about 30° C. Once the resin has gelled, the final cure may be performed. Preferably temperatures for the final cure are between about 20° and about 100° C. The resin is exposed to final cure conditions until the resin is completely cured. The tubesheet resin is exposed to curing conditions for a time sufficient to allow the resin to cure.

Access to the hollow fibers bores in the tubesheet can be achieved by one of several prior art techniques. The tubesheet can be drilled to open the fiber bores as in U.S. Pat. No. 4,080,296 (incorporated herein by reference). Loops of hollow fiber protruding from one side of the tubesheet can be cut. A portion of the tubesheet itself can be cut. Alternative methods are described in U.S. Pat. Nos. 3,422,008, 4,183,890, and 4,369,605 (all incorporated herein by reference).

The hollow fiber and tubesheet assembly (incorporated herein by reference) can take a variety of shapes and forms. U.S. Pat. Nos. 3,228,876 and 3,422,008 describe fibers arranged in a parallel, as a helix or bias-wrap fashion around a core or axis with a tubesheet at each end. The hollow fibers are embedded in and have lumens communicating through both sides of the tubesheet. The hollow fibers can also be looped so that both ends of the fiber extend through a single tubesheet, as in FIG. 1 of U.S. Pat. No. 3,422,008. Alternatively, one end of the fibers can terminate in an endsheet with the opposite ends communicating through a single tubesheet. U.S. Pat. No. 4,080,296 describes a membrane device wherein the fiber lumens communicate through a drilled tubesheet at a point removed from the ends or return loops of the hollow fibers. U.S. Pat. No. 3,455,460 (incorporated herein by reference) discloses one or two longitudinal tubesheets parallel to the axis of the fiber bundle.

The tubesheets referred to herein can take any of the configurations and be present in the manner suggested in the aforementioned prior art references, which are incorporated herein by reference. This invention is also intended to encompass modifications and alternative configurations of the tubesheets, fibers and optionally cores, which would be obvious to one of ordinary skill in the art. Preferably, the hollow fibers are arranged in a bias-wrap or parallel fashion about a perforated core with a tubesheet at each end of the bundle.

Water-wet fibers refer herein to fibers wherein the surface area of the fibers have not been dried. Water-wet fibers can include fibers wherein the surface of the fibers are saturated with water, wherein there is water on the outside of the surface, where there are drops of water contained on the surface of the fibers, and the like.

In some embodiments, the hollow fiber and tubesheet assemblies are placed in a casing. The casing is adapted for enclosing the hollow fibers, any core about which the hollow fibers are arranged, for example, a perforated core, and at least one tubesheet and is further adapted to prevent a leaking of the materials either into or out of the membrane device. The casing further may function to allow pressurization of the membrane device itself. Such casing generally provides a means for introducing the mixture to be separated, a means for removing the permeate stream, and a means for removing the non-permeate stream. Permeate stream refers herein to those portions of a feed mixture which selectively permeate through the hollow fiber membrane. Non-permeate stream refers herein to those portions of the feed stream which do not appreciably permeate or non-selectively permeate through the hollow fiber membrane. The casing can take any shape which allows it to function as hereinbefore described. In one embodiment, the casing is an elongated cylinder which is sealed at either end. The casing can be made of any material which protects the membrane device and which withstands the environment under which the membrane device is put to use.

In one embodiment, the casing fits around the membrane device in a manner such that one or more tubesheets contact the casing to form a seal around one or more of the tubesheets and to divide the device into at least two regions. In one embodiment wherein two tubesheets are used and the hollow fibers communicate through the ends of each tubesheet, the casing and tubesheets may form a three-compartment device wherein each compartment is sealed from the other. In such embodiment, the feed stream can be fed down the bores of the hollow fibers, from one end of the hollow fiber device wherein the non-permeate stream is taken off from the other end of the device as such non-permeate exits the lumens of the hollow fibers. In this embodiment, the permeate permeates through the hollow fibers onto the shell side of the device and can be removed either by an aperture in the casing in the region wherein the permeate permeates through the hollow fibers or can be taken out through the perforated core of the hollow fiber device.

In another embodiment, the mixed feed stream can be contacted with the outside of the hollow fibers by introducing them through an aperture in the casing in a manner such that the permeate permeates into the hollow fibers and is taken off from the device at the terminal end of the hollow fibers. The non-permeate is taken off from an aperture in the region of the hollow fiber device wherein the feed is introduced. In another embodiment, the mixed feed stream may be introduced through a perforated core. In this embodiment the feed stream radiates outward around and past the fibers. A portion of the selectively permeable species preferentially permeates into the hollow fibers and is taken off from the terminus of such fibers. The non-permeated materials are removed from an aperature in the casing.

Such devices can be fabricated by methods known in the art. U.S. Pat. Nos. 3,228,876; 3,422,008; 3,455,460 and 3,755,035 (incorporated herein by reference) are illustrative of some of the methods described in the art for fabrication of hollow fiber membrane devices, all incorporated herein by reference.

Evaporating water directly from membranes of water wet fibers of cellulosic materials deleteriously affects membrane characteristics by greatly reducing permeability. The physical integrity of the membrane can be adversely affected by drying. In one embodiment, this invention relates to a method of preparing hollow fiber tubesheet assemblies or membrane devices using water wet hollow fibers wherein the performance of the fibers is not deleteriously affected.

The operating conditions for separations using devices prepared from the hollow fiber and tubesheet assemblies of this invention are well-known to those skilled in the art. Examples of such conditions can be found in several of the patents cited hereinbefore and incorporated by reference.

SPECIFIC EMBODIMENTS

The following examples are descriptions of the preparation and testing of simulated tubesheets, which are prepared so that the strength could be measured to give an indication of the bond between the tubesheet resin and the fibers. These examples are included for illustrative purposes only and do not limit the scope of the claims or the invention. Unless otherwise stated, all parts and percentages are by weight.

Simulated tubesheet samples are prepared by winding a tow containing 30 individual, 310 micron diameter, hollow fibers of water wet cellulose triacetate into a bundle of approximately 6000 parallel fibers. These bundles which are about six inches long are then allowed to drip dry for 30 minutes then placed inside seven inch long pieces of 1¼ schedule 40 PVC pipe to produce a fiber packing factor of approximately 55% inside each pipe. Then elbows and standpipes are placed on either end of these fiber filled pipes. Resin mixtures are prepared and poured into one of the standpipes of each sample and with the aid of vacuum applied to the opposite standpipe the resin is caused to surround and encapsulate the fibers in order to form an artificual tubesheet with fiber packing density very similar to actual tubesheets formed by the method described in U.S. Pat. No. 3,755,034. After casting the resin for these samples, they are allowed to gel at room temperature then placed in an oven at 65° C. for 8 hours to complete the cure.

After this curing process, the simulated tubesheets are cut into six to ten ¼" slices and notched to provide samples with cross sections of ½×¼" for tensile testing. These samples are placed in the Instron tensile testing machine and the tensile strength is measured transverse to the fiber axis. The average of six to ten samples is reported as the strength of the samples. Tensile testing in this fashion gives an indication of the fiber resin bond because of the high fiber packing density. Resin/fiber combinations that have exceptional bonding characteristics will fracture by a mechanism that splits the fibers in two, while resin/fiber combinations that have poorer bonds will be weaker and will fracture at the surface between the fiber and the resin, leaving the fiber intact.

Simulated tubesheets are made using these techniques and tested by these procedures from combinations of ANCAMINE ® 1365 (a modified cycloaliphatic amine curing agent) or ANCAMINE ® 1942 (a cyanoethylated aliphatic amine) cured in stoichiometric amount with diglycidyl ether of Resorcinol (WC 69 from Wilmington Chemical Co.). A similar pair of experiments is carried out using a diglycydyl ether of bisphenol A (DER 331) as the epoxy for comparison. The results are as follows

| Example | Epoxy | Curing Agent | Tensile Strength, std dev (psi) |
|---|---|---|---|
| 1 | WC 69 | 1942 | 1144 +/− 89 |
| 2 | WC 69 | 1365 | 1025 +/− 173 |
| For comparison | | | |
| 3* | DER 331 | 1942 | 534 +/− 57 |
| 4* | DER 331 | 1365 | 470 +/− 106 |

*Not examples of the invention.

Each of the samples prepared from the WC 69 fail by fracturing fibers while the failure in the weaker samples from DER 331 is due to delamination of the fiber/resin bond.

What is claimed is:

1. A hollow fiber and tubesheet assembly which comprises
(1) contacting
   (A) a non-random fiber bundle comprising water wet cellulose ester hollow fibers wherein the fiber is water wet when the assembly is fabricated, wherein any of said fibers processed using plasticizers have been leached to remove the plasticizer; and
   (B) a tubesheet which comprises the reaction product of:
      (i) an epoxy resin composition comprising about
         (a) between about 10 and about 100 percent by weight of a diglycidyl ether of a dihydroxy benzene; and
         (b) between about 0 and about 90 percent by weight of a polyglycidyl ether of a polyhydric phenol which is not a diglycidyl ether of dihydroxy benzene; and
      (ii) a curing agent in sufficient amount to cure the epoxy resin composition;
wherein a portion of the hollow fibers are embedded in the tubesheet.

2. The assembly of claim 1 wherein at least about 20 percent by weight of the epoxy resin composition is a diglycidyl ether of a dihydroxy benzene.

3. The assembly of claim 2 wherein the curing agent is an amine curing agent.

4. The assembly of claim 3 wherein the hollow fiber comprises a water wet cellulose acetate fiber.

5. The assembly of claim 4 wherein the polyglycidyl ether of a polyhydric phenol is a diglycidyl ether of a bisphenol.

6. The assembly of claim 5 wherein the diglycidyl ether of a bisphenol corresponds to the formula

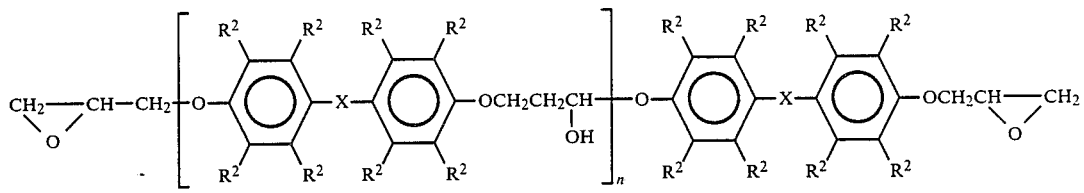

and the diglycidyl ether of dihydroxy benzene corresponds to the formula

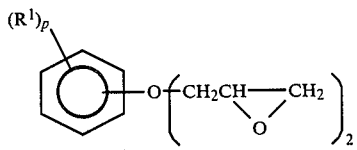

wherein
$R^1$ is separately in each occurrence alkyl, cycloalkyl, or halo;
$R^2$ is separately in each occurrence hydrogen, alkyl, or halo;
X is

S, —SO$_2$—, —O—, a C$_{1-6}$ divalent hydrocarbon, a C$_{1-6}$ divalent halohydrocarbon, or a divalent C$_{1-6}$ perhalocarbon;
n is a positive real number of from about 0 to about 6; and
p is separately in each occurrence an integer of from about 0 to about 4.

7. The assembly of claim 6 wherein:
$R^1$ is separately in each occurrence methyl or halo;
$R^2$ is separately in each occurrence hydrogen, methyl, fluorine, chlorine or bromine;
X is separately in each occurrence a C$_{1-6}$ alkyl, a, C$_{1-6}$ halo-substituted alkyl, or C$_{1-6}$ perhaloalkyl;
p is 0 or 1; and
n is 0 to 4.

8. The assembly of claim 7 wherein
$R^1$ is preferably chlorine or bromine;
$R^2$ is hydrogen or bromine; and
X is preferably C$_{1-6}$ alkyl.

percent by weight of a diglycidyl ether of a dihydroxy benzene and between about 30 and 60 percent by weight of a diglycidyl ether of bisphenol A or a resin derived therefrom.

12. A method of preparing a hollow fiber and tubesheet assembly which comprises
(1) contacting
  (A) a non-random bundle of cellulose ester hollow fibers, wherein the fibers are water wet, wherein any of said fibers processed using plasticizers have been leached to remove the plasticizer; with
  (B) a tubesheet composition which comprises
    (i) an epoxy resin composition comprising between about 10 and about 100 percent by weight of
      (a) a diglycidyl ether of a dihydroxy benzene; and
      (b) between about 0 and about 90 percent by weight of a polyglycidyl ether of a polyhydric phenol which is not a diglycidyl ether of dihydroxy benzene; and
    (ii) a curing agent in sufficient amount to cure the epoxy resin composition;
wherein a portion of the hollow fibers are embedded in the tubesheet; and
(2) exposing the hollow fibers and tubesheet composition to conditions such that the tubesheet composition cures with a portion of the hollow fibers embedded therein.

13. The method of claim 12 wherein at least about 20 percent by weight of the resin composition is a diglycidyl ether of a dihydroxy benzene.

14. The method of claim 13 wherein the curing agent is an amine curing agent.

15. The method of claim 14 wherein the hollow fibers comprise water wet cellulose acetate fibers.

16. The method of claim 15 wherein the polyglycidyl ether of a polyhydric phenol is a diglycidyl ether of a bisphenol.

17. The assembly of claim 16 wherein the diglycidyl ether of a bisphenol corresponds to the formula

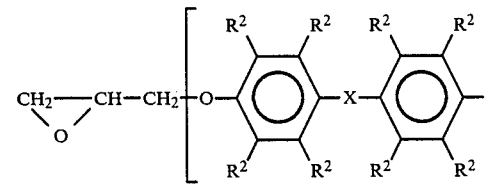 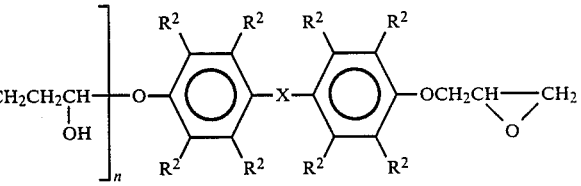

9. The assembly of claim 6 wherein the diglycidyl ether of a dihydroxy benzene is meta-dihydroxy benzene and the polyglycidyl ether of a polyhydric phenol is a diglycidyl ether of bisphenol A or a resin derived therefrom.

10. The assembly of claim 9 wherein the hollow fibers comprise cellulose triacetate.

11. The assembly of claim 10 wherein the epoxy resin composition comprise between about 40 and about 70 and the diglycidyl ether of dihydroxy benzene corresponds to the formula

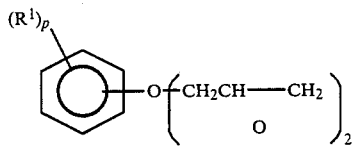

wherein $R^1$ is separately in each occurrence alkyl, cycloalkyl, or halo;

$R^2$ is separately in each occurrence hydrogen, alkyl, or halo

X is

S, $-SO_2-$, $-O-$, a $C_{1-6}$ divalent hydrocarbon, a $C_{1-6}$ divalent halohydrocarbon, or a $C_{1-6}$ divalent perhalocarbon.

n is a positive real number of from about 0 to about 6; and p is separately in each occurrence an integer of from about 0 to about 4.

18. The method of claim 17 wherein $R^1$ is separately in each occurrence methyl or halo;

$R^2$ is separately in each occurrence hydrogen, methyl, fluorine, chlorine or bromine;

X is separately in each occurrence a $C_{1-6}$ alkyl, a $C_{1-6}$ halo-substituted alkyl, or $C_{1-6}$ perhaloalkyl;

p is separately in each occurrence 0 or 1; and n is 0 to 4.

19. The method of claim 16 wherein the diglycidyl ether of a dihydroxy benzene is meta-dihydroxy benzene and the polyglycidyl ether of a polyhydric phenol is a diglycidyl ether of bisphenol A.

20. The assembly of claim 19 wherein the hollow fibers comprise water wet cellulose triacetate.

21. The assembly of claim 20 wherein the epoxy resin composition comprise between about 40 and about 70 percent by weight of a diglycidyl ether of a meta-dihydroxy benzene and between about 30 and about 60 percent by weight of a diglycidyl ether of bisphenol A or a resin derived therefrom.

22. The method of claim 17 wherein the cure temperature is between about 0° and 100° C.

23. The method of claim 22 wherein the hollow fibers and tubesheet composition are contacted as the hollow fibers are arranged about a hollow core by applying the tubesheet composition to the area of the fibers wherein the cured tubesheet is to be formed as such fibers are being arranged about the core.

24. The method of claim 22 wherein the non-random hollow fiber bundle is arranged about a hollow core prior to contacting with the tubesheet composition; and thereafter the area of the hollow fiber bundle about which the tubesheet to be formed is contacted with the tubesheet material and exposed to curing conditions.

* * * * *